July 20, 1965 W. E. BUCK 3,196,457
REFLECTANCE-TYPE MOTION PICTURE CAMERA
Filed Jan. 23, 1961 4 Sheets-Sheet 1

INVENTOR.
WILLARD E. BUCK
BY
ATTORNEYS

July 20, 1965

W. E. BUCK 3,196,457

REFLECTANCE-TYPE MOTION PICTURE CAMERA

Filed Jan. 23, 1961

INVENTOR.
WILLARD E. BUCK
BY

ATTORNEYS

July 20, 1965 W. E. BUCK 3,196,457
REFLECTANCE-TYPE MOTION PICTURE CAMERA
Filed Jan. 23, 1961 4 Sheets-Sheet 3
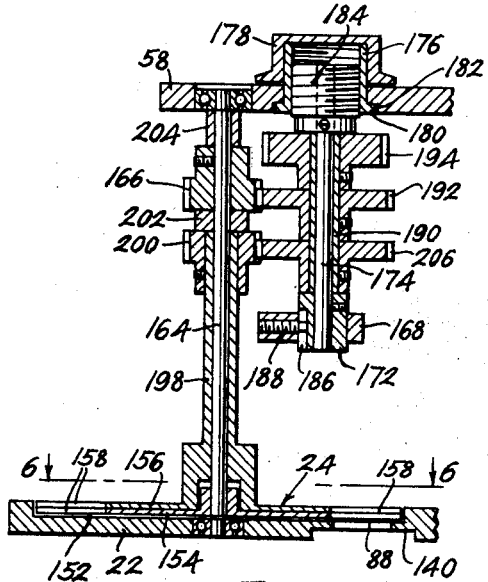
FIG. 5.
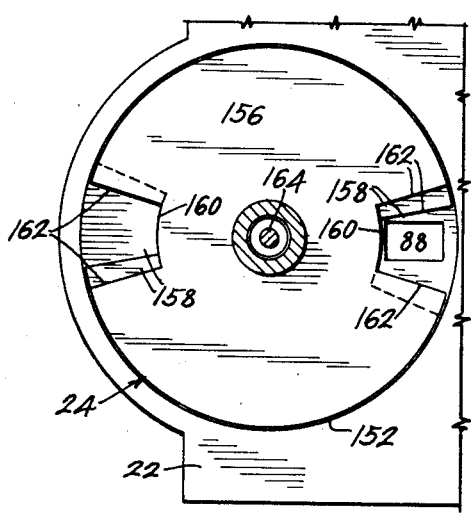
FIG. 6.
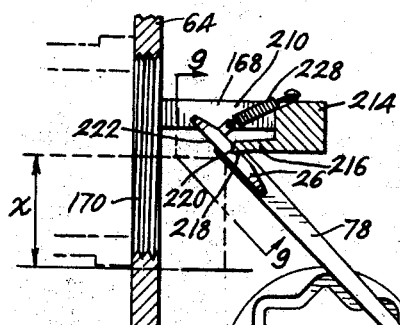
FIG. 8.
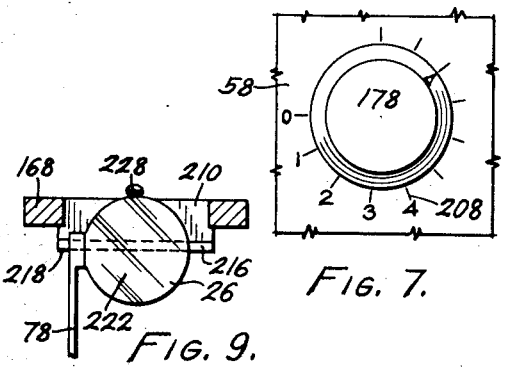
FIG. 9.  FIG. 7.  FIG. 10.
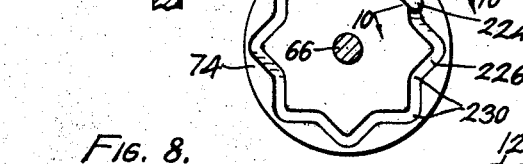
FIG. 12.
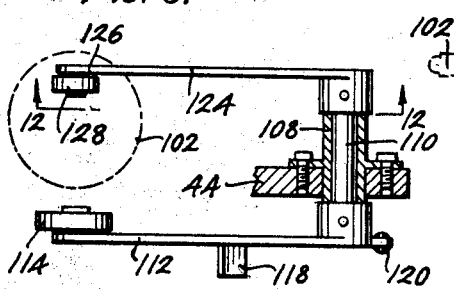
FIG. 11.
INVENTOR.
WILLARD E. BUCK
BY
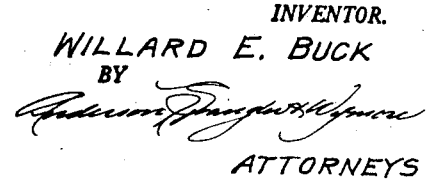
ATTORNEYS July 20, 1965  W. E. BUCK  3,196,457
REFLECTANCE-TYPE MOTION PICTURE CAMERA
Filed Jan. 23, 1961  4 Sheets-Sheet 4

INVENTOR.
WILLARD E. BUCK
BY
ATTORNEYS

United States Patent Office 3,196,457
Patented July 20, 1965

3,196,457
REFLECTANCE-TYPE MOTION PICTURE CAMERA
Willard E. Buck, P.O. Box 357, Boulder, Colo.
Filed Jan. 23, 1961, Ser. No. 84,000
15 Claims. (Cl. 352—109)

This invention relates to motion picture cameras and, more specifically, to cameras of the type aforementioned in which the film is transported past the lens at a moderately high rate of speed while the image follows the moving film by means of a wobbling or rotating mirror.

In extremely high speed motion picture cameras of the order of a million frames per second and more, the film is always held stationary while the image being reproduced is swept across the face thereof by means of a rotating mirror or else is moved into different positions on the film plane by a complex system of lenses. In fact, in any motion picture camera designed to operate at speeds in excess of approximately 6000 frames per second, the film must be held stationary due to mechanical limitations concerned with transport of the film at higher speeds.

There are, however, many applications where a camera operable in the range of between approximately 500 and 5000 frames per second is required. This range includes that at which the film can be moved, the upper limit being about 6000 frames per second based upon 16 mm. film transported at 150 feet per second. Of course, even at these speeds, it is necessary to provide a mechanism whereby the image to be reproduced is moved along at the same rate as the film in order to prevent blurring. While cameras designed for operation at these speeds have been made, they have proven to be unsatisfactory from the practical standpoint for several reasons.

To begin with, the camera became quite bulky due to the fact that about 80% of the motor power was required to operate the wind-up spool due to the constant torque applied thereto rather than drive the mirror thus necessitating an oversized drive motor. Of even greater significance, however, was the fact that the prior art mirror systems were extremely difficult to synchronize with the movement of the film. Also, the film transport mechanism was such that a non-uniform tension was maintained on the film due to the varying diameter of the film spooled on the take-up reel creating certain film breakage problems. Finally, and perhaps of primary significance, is the fact that the known cameras lack versatility in terms of being adaptable for use with lenses of varying focal lengths or operation and at different shutter speeds.

The motion picture camera which forms the subject matter of the instant application, on the other hand, obviates the aforementioned difficulties by providing a novel film transport and mirror wobbling or rotating assembly that functions to maintain a constant film tension while mechanically synchronizing the movement of the reflected image with the movement of the film. With regard to the film transport mechanism, the instant camera employs a unique variable ratio take-up reel drive interconnecting the drive motor and take-up spool which is operative to maintain a constant film tension thus enabling a much smaller drive motor to be used than was heretofore required. The remaining advantages can best be understood by considering the four different embodiments of the present camera separately as each has certain good points as well as limitations.

First, by placing a wobble-type reflecting surface between the lens and film plane, the resulting camera is extremely versatile because lenses of varying focal lengths and apertures can be used interchangeably. Also, this system is quite inexpensive when compared with the cost of multi-faced rotating mirror units due to the fact that only one surface need be polished. This design does, however, have certain limitations in that it is not capable of operating at the higher speeds that can be achieved with the rotating multi-faced mirror system. Also, the throw of the cam track in the wobble cam that is required to oscillate the mirror through the angle necessary for the reflected image to follow the film movement is somewhat greater than the design wherein the lens is located between the mirror and film plane. The foregoing results from the fact that the lever arm extending between the wobble cam and mirror is much shorter than that required with the lens located between the mirror and film plane.

The second modification has already been mentioned briefly above and is the one in which the lens is located between the wobble mirror and film plane. Here again, the mirror is less expensive than the multi-faced ones designed for rotation. The significance of the longer lever arm in comparison with that of the first design is the higher film speed attainable when the mirror does not have to swing so far. Also, the image is always focused at the film plane due to the corrective factors built into the lens which results in better resolution. As for the limitations, this design is of necessity a fixed local length system and is, therefore, somewhat less versatile than one in which various lenses can be used interchangeably.

The third modification is analogous to the second except that a multi-sided rotating mirror is substituted for the single-faced wobble mirror. This camera has an extremely short exposure time due to the high film transport speeds that can be used coupled with the fact that the reflected image can follow the film at the fastest speeds at which the latter can be transported. As with the second modification, this system lacks versatility because it is of fixed focal length thus eliminating the advantage of being able to interchange lenses. Also, the multi-sided rotating mirror is considerably more expensive than the single-faced wobble type.

Finally, the fourth type is similar to the first with a multi-sided rotating mirror located between the lens and film plane in place of the wobble mirror. Obviously, as before, the advantage of lens interchangeability is realized plus higher film speeds than are possible to achieve with a wobble mirror. As with the third type, however, the mirrors are much more expensive to produce.

It is, therefore, the principal object of the present invention to provide a novel and improved relatively high speed motion picture camera of the reflectance type in which a wobbling or rotating mirror is used to transfer the image to a continuously moving film.

A second object is the provision of a camera of the type aforementioned which includes a film transport mechanism adapted to maintain a constant film tension irrespective of the variations in diameter of the film spooled on the take-up reel.

Another object of the invention is to provide a motion picture camera in which positive mechanical synchronization is maintained between the moving film and the image reflected thereon.

Still another objective is the provision of a wobbling mirror type reflected image camera wherein a novel and simplified wobble mechanism is employed to advantage.

An additional object of the invention is to provide a moderately high speed motion picture camera which includes as one of its most significant features, a double-disk rotating shutter that can be varied as to speed by adjusting one disk relative to the other even though the angular velocity thereof remains constant.

Further objects are the provision of a camera of the type described herein which is extremely versatile, relatively inexpensive, substantially foolproof, easy to service and maintain, uses standard lenses, is adaptable for use with large frame sizes, has an excellent exposure time to framing interval ratio, and one that provides better image quality due to more linear synchronization.

Other objects will be in part apparent and in part pointed out specifically hereinafter in connection with the description of the drawings that follows, and in which.

Figure 3:
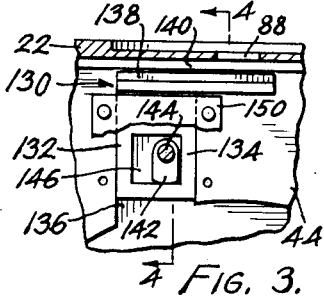
Figure 4:
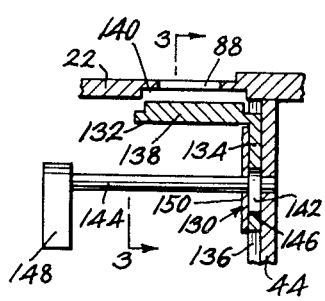
Figure 13:
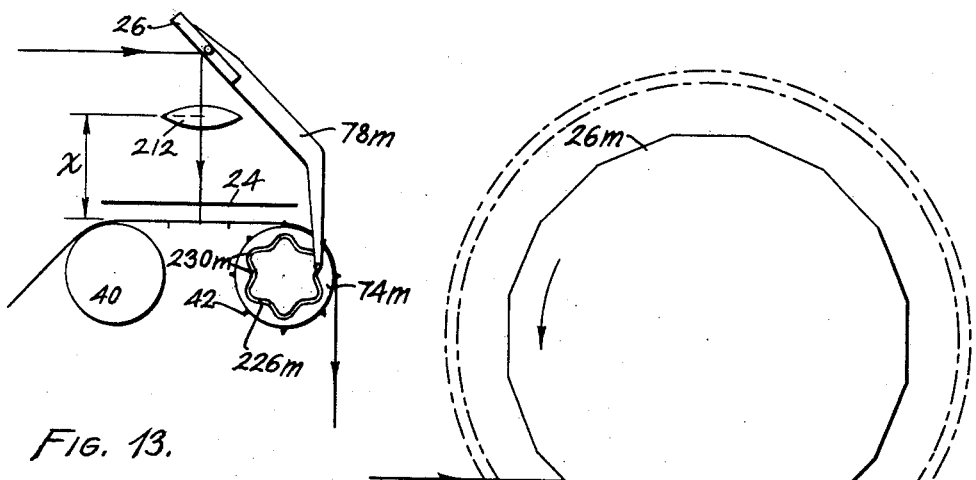
Figure 14:
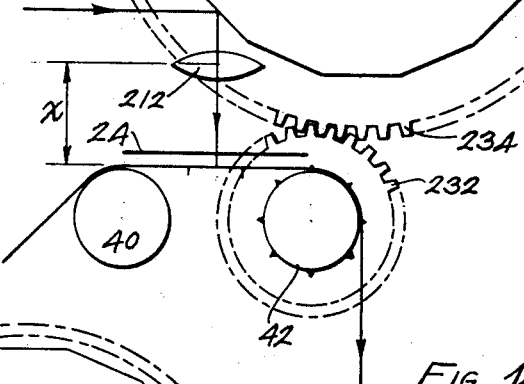
Figure 15:
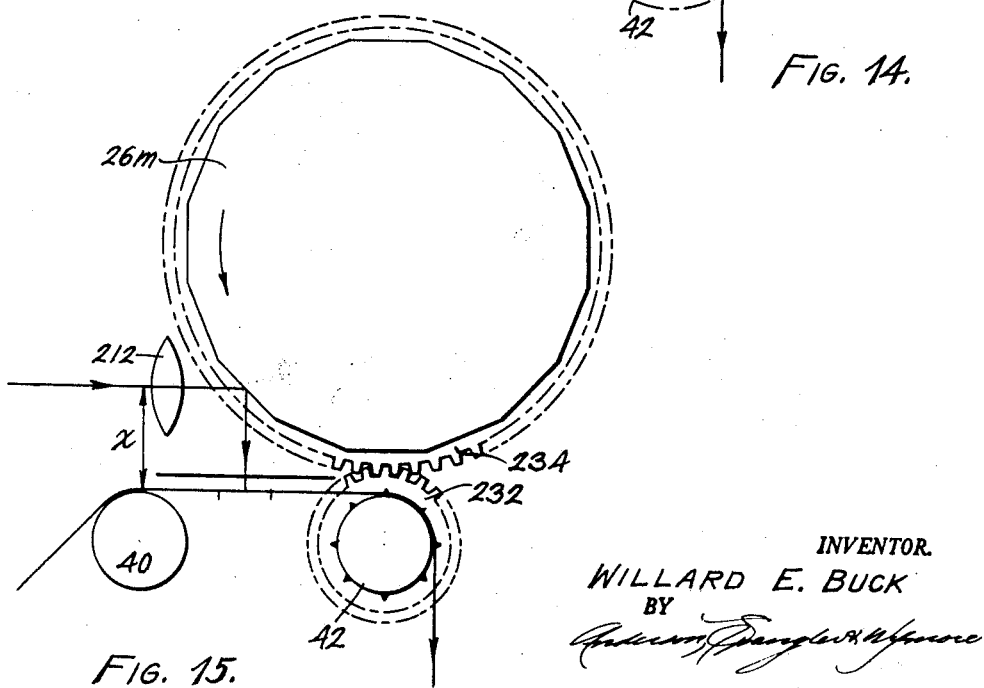

FGURE 3 is a fragmentary section taken along line 3—3 of FIGURE 4 illustrating the pressure plate assembly;

FIGURE 4 is a fragmentary section taken along line 4—4 of FIGURE 3;

FIGURE 5 is a fragmentary section showing the shutter and associated adjustment mechanism;

FIGURE 6 is a section taken along line 6—6 of FIGURE 5;

FIGURE 7 is a fragmentary detail of the shutter speed control;

FIGURE 8 is a fragmentary section illustrating the wobble mechanism for the mirror;

FIGURE 9 is a fragmentary section taken along line 9—9 of FIGURE 8;

FIGURE 10 is a fragmentary section taken along line 10—10 of FIGURE 8;

FIGURE 11 is a sectional detail of the film tensioning mechanism;

FIGURE 12 is a section taken along line 12—12 of FIGURE 11;

FIGURE 13 is a schematic showing a modification wherein the lens is located between the wobble mirror and film plane;

FIGURE 14 is a schematic showing a further modification similar to FIGURE 13 in which a multi-sided rotating mirror is substituted for the wobble mirror; and, FIGURE 15 is a schematic illustrating still a further modification in which a rotating mirror has been substituted for the wobble mirror of the basic structure shown in FIGURES 1-12.

Figure 1:
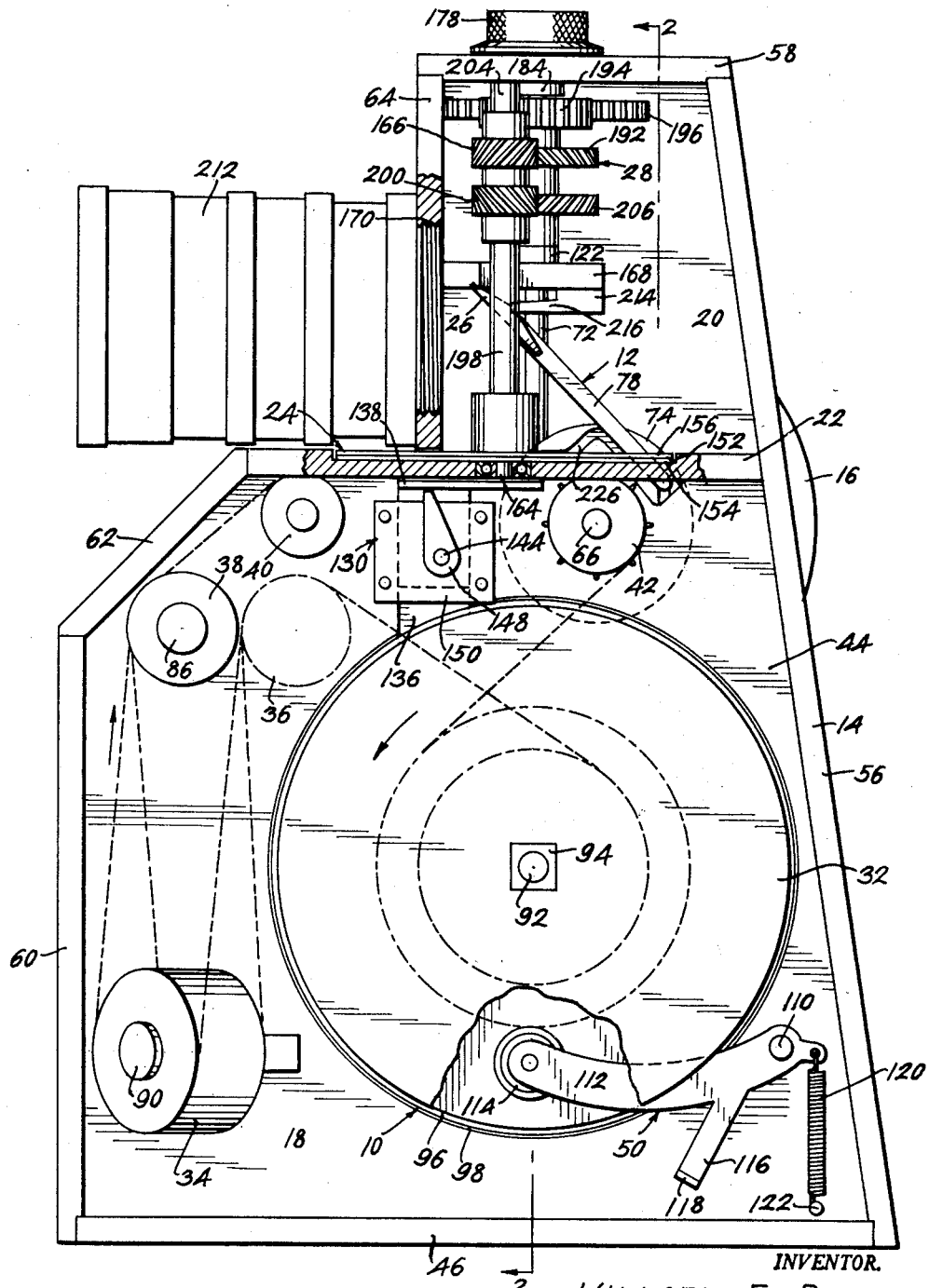
FIGURE 1 is a side elevation of the camera of the present invention with the cover removed and certain portions either broken away or shown in section to better illustrate the details.
Figure 2:
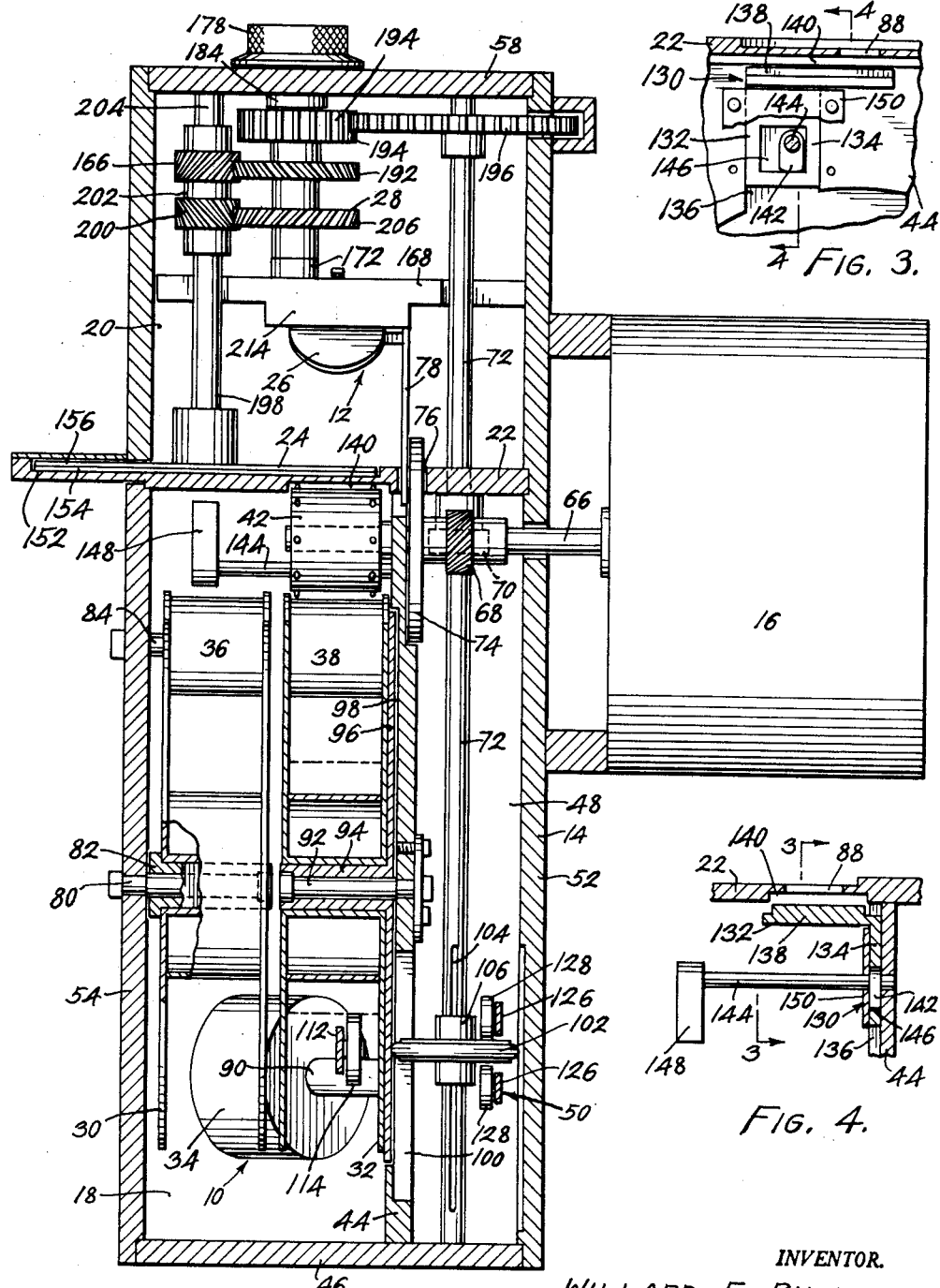
FIGURE 2 is a section taken along line 2—2 of FIGURE 1.

Referring now to the drawings for a detailed description of the motion picture camera of the present invention, and in particular to FIGURES 1 and 2 for this purpose, it will be seen that the film transport mechanism and image reflecting assembly which have been designated broadly by reference numerals 10 and 12, respectively, are enclosed within a housing 14 on which an electric motor or some other drive mechanism 16 is mounted. The interior of the housing or case 14 is divided into a film compartment 18 and a mirror compartment 20 by a transverse wall 22 that provides a support for the variable speed double-disk shutter mechanism that has been indicated in a general way by numeral 24. Mirror compartment 20 houses the image-reflecting mirror 26 as well as the gear train 28 that drives the shutter. The film compartment 18, on the other hand, houses the film storage reel 30 and the take-up reel 32 which are arranged therein in concentric superimposed relation. This same compartment also holds film threading idlers 34, 36, 38 and 40 along with the feed sprocket 42.

Compartment 18 is divided longitudinally by a partial wall 44 that extends between bottom wall 46 and transverse wall 22 providing a third compartment 48 which encases the several elements of the constant film tension assembly that has been designated in its entirety by reference numeral 50. Side walls 52 and 54, rear wall 56, top wall 58, and wall portions 60, 62, and 64 that constitute the front wall complete the case 14.

The electric motor 16 that forms the common drive for the film tensioning and transport assembly 50, the image reflectance assembly 10 and the shutter mechanism 24 is mounted on side wall 52 with its output shaft 66 entering compartments 48 and 18 of the case through appropriately positioned apertures in walls 52 and 44. A left-hand helical gear 68 is mounted on the output shaft 66 for rotation therewith in compartment 48. This gear meshes with a second left-hand helical gear 70 that is represented by dotted lines in FIGURE 2 and which is mounted on shaft 72 that is journalled for rotation between the top and bottom walls 58 and 46 passing through a shaft bearing (not shown) in transverse wall 22. Intermediately beyond gear 18, the wobble cam 74 that oscillates mirror 26 in a manner which will presently be set forth, is mounted on output shaft 66 for rotation therewith in compartment 48. An opening 76 is provided in transverse wall 22 through which a portion of the periphery of the wobble cam extends as well as the lever arm 78 operatively interconnecting said cam and mirror 26. On the same shaft 66, but on the other side of partial wall 44, the film sprocket 42 is mounted for rotation within compartment 18.

Side wall 54 carries on the inside surface thereof, storage reel spindle 80 on which is mounted for rotation a square sleeve 82 that receives the take-up reel 30. The portion of side wall 54 which covers compartment 18 is preferably hinged along the front edge to facilitate changing reels and threading of the film. Idler spool 36 is also mounted for rotation on a spindle 84 depending from side wall 54 beyond the edge of the reels but in position to receive film from storage reel 30 as shown most clearly in FIGURE 2. Idler spool 38, on the other hand, is mounted for rotation on a spindle 86 that projects from partial wall 44 so that it will be in position to feed film onto idler 40 which is likewise mounted in the compartment 18 adjacent the framing aperture 88 which can best be seen in FIGURES 5 and 6. The fact that reels 30 and 32 together with their associated idlers 36 and 38 lie in different planes demands that inclined idler 34 be positioned between the latter for the purpose of transferring the film between these two planes. Accordingly, spindle 90 on which idler 34 is journalled, is inclined at approximately 45° relative to partial wall 44 from which it projects into compartment 18. Thus, as can be easily seen from a comparison of FIGURES 1 and 2, the film being taken from supply reel 30 passes over idler 36 which is in alignment therewith and moves onto that portion of the cylindrical surface of inclined idler 34 that lies in approximately the same longitudinal position although the film has been twisted about 45°; whereupon, the film leaves the opposite portion of the cylindrical surface of idler 34 displaced laterally by approximately the amount required to feed directly onto idler 38 positioned in a different plane from idler 36. As the film passes between the inclined idler and idler 38 it is untwisted and aligned for movement onto idler 40 which lies ahead of the framing aperture 88. After the film moves across the framing aperture 88 where it is exposed, it moves onto sprocket 42 which is turned by the output shaft 66 and functions to draw film from the supply reel and move it past the framing aperture 88, the supply reel spindle 80 and associated sleeve 82 cooperating with one another to resist the removal of film by means of a frictional slip fit adapted to maintain the film constantly tensioned.

One of the most novel features of the film transport system 12, however, is the means by which the film is maintained under uniform tension as it is wound onto the take-up spool 32 thus eliminating the need for oversized drive motor to carry the heavy torque load when the reel is nearly full and turning relatively slowly. The take-up spool spindle 92 is mounted on partial wall 44 in position to project into cavity 18 in axial alignment with the spindle 80 of the supply reel. Sleeve 94 which has a square cross section is mounted for rotation on spindle 92. A circular skirt 96 depends from the margin of the sleeve 94 and rotates therewith in a recess 98 provided therefor in wall 44. This skirt is substantially the same diameter as the take-up reel and functions as a support for the latter as well as a means for driving same as will now be explained.

Note in FIGURE 2 that partial wall 44 includes an opening 100 adjacent the skirt 96 and providing access to shaft 72 located within compartment 48. Mounted on shaft 72 is a rubber-tired wheel 102 which is also longitudinally adjustable therealong by reason of a slot 104 in the shaft and a cooperating pin (not shown) within hub 106 which rides in the aforementioned slot. Thus, with shaft 72 being driven at a fairly uniform speed by motor 16, if wheel 102 could move radially outwardly on skirt 96 at the same rate at which the film builds up on the take-up reel 32, the film would be maintained under susbtantially uniform tension and the torque load on the motor would be almost constant by reason of the fact that the reel is turned slower and slower as the wheel moves out onto the periphery of the skirt. The means by which this is accomplished can best be seen in FIGURES 1, 2, 11 and 12 to which reference will now be made.

Partial wall 44 includes an aperture adapted to receive a flanged bushing 108 which contains a stubshaft 110 extending into both adjoining compartments 18 and 48 at a point located outside the periphery of the take-up reel. An arcuately-shaped arm 112 is attached to that end of shaft 110 which terminates in compartment 18 in position such that a free end of the arm can move within the cavity defined by the flanges of the take-up reel. A roller 114 is journalled for rotation on the free end of this arm for rolling engagement with the film that builds up on the hub of the take-up spool as is indicated most clearly in FIGURES 1 and 2. A branch 116 with an upturned end portion 118 is preferably provided on arm 112 for purposes of retracting the latter while changing reels. The rollerless end of arm 112 has a tension spring 120 attached thereto and to a pin 122 depending from wall 44 for purposes of biasing the arm into rolling engagement with the film spooled on the take-up reel.

The other end of shaft 110 is provided with a second arm 124 which includes a bifurcated end portion 126 adapted to lap wheel 102 within compartment 48. Each tine of the bifurcated end portion mentioned above is provided with a roller 128 adapted to roll along opposite faces of the wheel and move the latter longitudinally along slotted shaft 72 in response to changes in the diameter of the film spooled on the take-up reel which are transmitted by arm 112. As seen most clearly in FIGURE 2, the slot in the bifurcated end portion 126 of arm 124 lies in substantial alignment with the axis of rotation of roller 114 on the end of arm 112 so that movements of the wheel 102 correspond quite closely with the build-up of film on the take-up spool or reel.

One remaining feature of those located within compartment 18 has yet to be described, namely, the pressure plate assembly which has been referred to broadly by numeral 130 that functions to hold the film against those portions of transverse wall 22 that border aperture 88. This feature has been illustrated in FIGURES 1, 2, 3, and 4 wherein it will be seen to include a generally L-shaped pressure plate 132 having one rectangular portion 134 mounted for slidable movement within a recessed track 136 formed in partial wall 44 while the other or second rectangular portion 138 moves therewith from a retracted position into an extended position within a recess 140 provided in the face of transverse wall 22. Track 136 is located within compartment 18 and lies normal to the transverse wall 22 in alignment with framing aperture 88. Recess 140, on the other hand, defines a second track that also contains a portion of both idler 40 and sprocket 42 in which the film is confined as it moves across the framing aperture. Retraction of the pressure plate 132 from within the aforementioned film track is, of course, necessary to permit threading of the film in this area of the camera.

Movement of the pressure plate between extended and retracted position is accomplished by means of a dog 142 located on the end of a shaft 144 which is mounted for rotation on wall 44 within an opening 146 provided in the slidable portion 134. Rotation of shaft 144 by means of handle-forming portion 148 causes the rounded end of dog 142 to engage either the front or rear edge of rectangular opening 146 causing the pressure plate 132 to slide forwardly or rearwardly between extended and retracted positions. This plate is maintained in extended position whenever the camera is in operation and the film is moving across the framing aperture. A keeper plate 150 is fastened to wall 44 across track 136 for the purpose of maintaining the pressure plate in place.

Next, the variable speed double-disk shutter mechanism 24 will be described in detail in connection with FIGURES 1, 2, 5, 6 and 7 of the drawings. The face of transverse wall 22 contains a circular recess 152 located within mirror compartment 20 which overlies the framing aperture 88 and is positioned adjacent its outer edge. A pair of superimposed concentric circular shutter disks 154 and 156 are positioned within recess 152 in which they rotate as well as shift positions relative to one another to vary the shutter speed in a manner which will be described in detail presently. For the time being, however, it should be noted that each of these disks includes at least one sizeable notch 158 in its periphery adapted in one rotarial position to register with the framing aperture in wall 22. The inside edge 160 of these notches is spaced inwardly from the periphery of the disk a radial distance at least sufficient to completely uncover the framing aperture 88. The side edges 162, on the other hand, extend radially in the particular embodiment illustrated herein and are spaced apart angularly a distance which determines the shutter speed and, therefore, the exposure time at a given constant angular velocity. As illustrated herein, the angular spacing between the sides of the notches 158 is selected such that they uncover the framing aperture for an interval equal to approximately one-fifth the time required for a given increment of film to traverse the entire height of the framing aperture as will be explained in detail presently.

Note, also, that each disk has a pair of diametrically-located notches to provide two exposures for each complete revolution thereof. Obviously, several equiangularly-spaced notches could be used depending upon the relative speeds of shutter disk rotation and film movement although as few notches as possible should be used for best results consistent with proper dynamic balance. Each disk, therefore, comprises a rotating shutter which, in and of itself, would be effective to intermittently open and close the framing aperture for a fixed interval one or more times during each revolution as both disks are driven at a constant speed by motor 16. Accordingly, for the sake of simplicity, consider the camera as having only a single disk 154 until such time as the description of the constant interval shuttering function has been completed.

Disk 154 is mounted for rotation with a shaft 164 which is journalled between transverse wall 22 and top wall 58 of the case or housing 14. A right-hand helical gear 166 is attached to shaft 164 adjacent the upper end thereof for purposes of turning the latter and the associated shutter disk.

A mirror-support plate 168 is attached to portion 64 of the front wall bridging the internally-threaded lens mount 170 in spaced substantially parallel relation to top wall 58. A bushing 172 is mounted within an opening in plate 168 for reciprocal movement toward and away from wall 58. This bushing has a shaft 174 (FIGURE 5) attached therein that extends upwardly through an opening provided in the top wall that contains an internally-threaded sleeve 176 which is mounted for rotation therein and is covered by a cap-forming knurled knob 178. A peripheral flange 180 on the bottom of the sleeve 176 moves within an annular groove 182 on the inside of wall 58 and cooperates with knob 178 to keep the sleeve in place. An externally-threaded collar 184 is attached to the upper extremity of shaft 174 and is threadedly mounted inside sleeve 176. Rotational movement of bushing 172, shaft 174 and collar 184 in response to rotation of the sleeve 176 by means of knob 178 is prevented due to the presence of a keyway 186 in the bushing and the associated pin 188 that projects into the latter from plate 168 as shown in FIGURE 5. Thus, by turning knob 178, shaft 174 moves up or down along with the bushing and collar associated therewith, but without rotating. The significance of this reciprocal action will become apparent later on; however, for the moment, the aforementioned assembly is important only as a means for supporting and journalling tubular gear support member 190 on shaft 174 between bushing 172 and collar 184 in spaced parallel relation to shaft 164.

This tubular element 190 is freely rotatable on shaft 174 and a left-hand helical gear 192 is attached thereto which meshes with the right-hand helical gear 166 on shaft 164 providing a driving connection therebetween. Element 190 is also provided with a spur gear 194 that meshes with a second spur gear 196 attached to shaft 72 within the mirror compartment. Accordingly, the motor 16 drives the shutter disk 154 at a speed which bears a fixed relation to the speed of the film by means of output shaft 66, helical gears 68 and 70, shaft 72, spur gears 196 and 194, helical gears 192 and 166, and shaft 164.

Alternatively, the constant speed shutter action of the second shutter disk 156 will be considered independent of disk 154 which was described in detail above. In the particular form illustrated herein, disk 156 is shown as an integral part of hollow shaft 198 that depends from the center thereof and is mounted on shaft 164 for relative rotational movement. A left-hand helical gear 200 of the same diameter and pitch as helical gear 166 on shaft 164 is attached to hollow shaft 198 for rotation therewith. Tubular spacers 202 and 204 mounted on shaft 164 separate helical gear 200 from helical gear 166 and the latter from top wall 58. A right-hand helical gear 206 of the same diameter and pitch as helical gear 192 is attached to tubular element 190 for rotation therewith in meshed engagement with helical gear 200 thus forming a driving connection operative to rotate shutter disk 156 in the same direction and at the same speed as disk 154 by means of the spur gears 194 and 196 together with the meshed helical gears 68 and 70 that interconnect shafts 66 and 72. It should be apparent, therefore, that either of the shutter disks 154 or 156 is capable of performing the intermittent shuttering function of the camera independent of the other, but at a fixed shutter speed. It is, however, the important adjustable shutter speed function of the camera that requires the two substantially identical superimposed disks 154 and 156 as will now be described in detail in connection with FIGURES 5, 6 and 7.

As has already been mentioned, both the shutter disks are essentially the same except for their particular shaft connections as each has the same number of notches 158 in the edge arranged in equiangularly spaced relation to one another and of the same size and shape. As a result, if the notches in the superimposed disks were placed in exact register with one another, the interval or intervals during each complete turn of the disks that the shutter would be open to expose the film would be constant and at a maximum determined by the angular width of the notches 160. If, however, the superimposed disks 154 and 156 are rotated or shifted angularly relative to one another such that the notches 158 therein are not in exact register but rather overlap one another such that the effective width of the resultant opening is less than the width of any notch alone, the speed of the shutter will be increased materially even though both disks still turn at the same angular velocity as determined by the speed of motor 16. As such, the superimposed disks and misaligned notches therein perform a function quite analogous to a focal plane shutter found on many commonly used cameras. Thus, by rearranging the disks such that the effective width of notch 158 is one-half that of a single notch alone, the interval during which the framing aperture 88 is uncovered is halved thereby doubling the shutter speed.

The mechanism by which this reorientation of the superimposed shutter disks is accomplished to vary the effective width of notches 158 has already been described except, perhaps, for the scale 208 (FIGURE 7) found on top wall 58 bordering the shutter speed control knob 178. The mode of operation of this mechanism, however, has yet to be set forth in detail.

Note first, that helical gears 192 and 206 are of opposite hand and cannot turn relative to one another but can reciprocate up and down as element 184 to which they are operatively connected moves in and out of threaded collar 176 when the latter is turned by means of knob 178. Secondly, helical gears 166 and 204 that mesh with the first-mentioned pair are also of opposite hand but connected to their respective shafts 164 and 178 such that they cannot move up or down but only turn independent of one another. By now it should be apparent, especially by referring to FIGURE 2, that when knob 178 is turned in a direction to raise helical gear pair 192 and 206, helical gear 166 will turn shutter disk 154 clockwise as viewed in FIGURE 6 while, at the same time, helical gear 200 will turn in the opposite direction moving shutter disk 156 counterclockwise thus narrowing the notches 158. Turning shutter control knob 178 in the opposite direction, of course, lowers the first pair of relatively fixed helical gears causing each of the relatively movable pair to turn in the opposite direction whereupon they gap formed by the overlapping disks widens. It is significant to note in this connection that when the shutter disks are being turned by the motor 16, they occupy a fixed position relative to one another and the design of the meshed pairs of fixed and movable helical gears is such that all forces tending to change the relative rotarial positions between the disks are balanced out.

As noted above, both shutter disks turn relative to one another at the same rate but in opposite directions when adjustments in the shutter speed are being made rather than having only one of the disks turn relative to the other which would remain stationary and is obviously a simpler design from the mechanical standpoint. Note, however, that if only one disk could be adjusted angularly, the radial center line of the resulting effective notch or shutter opening would shift up or down angularly relative to the image reflected by the mirror onto the film through the framing aperture, the latter being a fixed relationship for a given camera design as determined by the orientation of the cam track or groove in the wobble cam with reference to the motor shaft. Accordingly, it becomes imperative that irrespective of the effective opening defined by the overlapping notches of the shutter disks that the radial center line thereof occupy a fixed relation to the image reflected onto the film through the framing aperture and this can only be accomplished by turning both disks relative to one another the same angular distance but in opposite directions as has been described in considerable detail above.

The next feature of the camera which demands detailed consideration is that of the mirror wobble assembly 10 as seen most clearly in FIGURES 1, 2, 8, 9 and 10 to which reference will now be made. As has been mentioned previously, the mirror support plate 168 is attached to the inside of front wall portion 64 in position to bridge the internally-threaded lens mount 170. A forwardly-opening notch 210 faces the lens 212 and is of a width somewhat greater than the diameter of mirror 26 which is circular as shown. That portion 214 of the plate 168 extending along the rear of the notch is preferably thickened as illustrated and provided with a forwardly projecting flange 216 that terminates in a knife-edge 218 extending laterally in normal relation to the lens axis. The rear face of the mirror 26 is provided with a diametrical V-shaped groove 220 adapted to receive knife-edge 218 utilizing the latter as a fulcrum for wobbling movement. The plane polished face 222 of the mirror is preferably located such that its center lies on the axis of the lens in position to intercept the light passing through the latter and reflect it through the framing aperture 88 onto the film. The film, of course, is moving past the framing aperture continuously and at such a high rate of speed that the image focused thereon would be blurred and indistinguishable if it remained stationary. Therefore, the mirror must tilt in a manner to sweep the image across the framing aperture at the same rate at which the film is moving so no relative movement takes place between the image and film during the interval the shutter is open. Then, immediately after the shutter closes the framing aperture, the mirror must be returned to its original position preparatory to another exposure.

In the embodiment of FIGURES 1–12, inclusive, this is accomplished by means of wobble cam 74 and lever arm 78 which operatively interconnects the mirror and cam. Lever arm 78 has one end attached to the edge of mirror 26 while the other end is operatively connected to cam 74 by means of cam follower 224 that rides within cam groove 226. The lever arm, cam follower (FIGURE 10) and wobble cam cooperate with a tension spring 228 fastened between plate 168 and the mirror to hold the latter in place on knife-edge fulcrum 218. It is most significant to note that the wobble cam 74 is mounted directly on the output shaft 66 of the motor and, therefore, has a positive mechanical drive capable of synchronization.

Before proceeding with a detailed description of the cam groove 226, it would be advisable to consider the several factors which influence its design. To begin with, the speed at wich the film moves or is transported by the feed sprocket on the output shaft past the framing aperture is a fixed and known quantity. Secondly, the angular velocity of the superimposed shutter disks is also a known and fixed quantity as well as the latter's relationship to the film transport speed. As yet, however, the distance the film will move past the framing aperture while the shutter is open to expose same is an unknown quantity.

Relatively high speed motion picture cameras of the type to which the present invention relates are primarily useful in photographing short-lived events at known intervals during their cycle of operation. To make this sequence of exposures meaningful it is, therefore, necessary that an interval of time elapse between successive exposures such that a significant change is evident therebetween rather than have them so close to one another in terms of the operating sequence that little if anything appears to have happened. This problem has been given careful consideration by others in the past and it is generally recognized that the time-lapse between successive exposures should be at least five times that required to expose each frame.

Taking the foregoing factor into consideration, the maximum shutter opening corresponding to the minimum shutter speed was selected such the shutter would uncover and cover again the framing aperture during the time interval required for the film to traverse one-fifth of the height of the framing aperture 88. In other words, once the height of the framing aperture is known along with the film speed and rotational velocity of the shutter disks, it is a relatively simple matter to calculate the angular spread between the lead and following edges of the shutter notches required to expose the film during one-fifth the time required for a given increment thereof to move the full height of the framing aperture. Incidentally, as noted above, the height of the framing aperture enters significantly into these calculations although it is also a variable that determines the size of the frame on the film. In this particular situation, the film frame size would be four-fifths of the height of the framing aperture although the same width. Thus, the height of the framing aperture that is chosen should be such that the height of the film frame is adequate in relation to its width.

Next, a brief look should be taken at the reasoning which influences the selection of the number and size of the notches in the shutter disks. Perhaps the most significant factor is that of the so-called "focal plane effect" on moving objects which is present in the instant camera to the same extent it is in ordinary focal plane shuttered still and movie cameras. This phenomenon causes foreshortening or elongation of moving objects travelling in the same or opposite direction to that of the shutter's movement due to the fact that while the slit in the curtain is moving from one position to the next, the object being photographed has also changed position. The focal plane effect becomes more pronounced as the speed of the moving object becomes greater in relation to the shutter speed at the same shutter opening and also as the width of the shutter opening becomes narrower even though the angular velocity of the shutter remains constant in relation to the speed of the object being photographed. Therefore, a fast shutter velocity with a wide shutter opening is preferred over a slow shutter velocity and a narrow shutter opening even though both can be made to provide the same instantaneous exposure or shutter speed. This results because the wide shutter opening exposes more of the film during a given instant than the narrow one and less relative motion of the moving object can take place while the shutter is uncovering successive increments of the film. In unbalanced shutter disks with a single notch in their peripheral edge, the maximum shutter speed is that which does not produce excessive vibration and bearing wear. A shutter disk with a single notch could, of course, be balanced by the addition of a mass to replace that material removed in forming the notch. In the particular embodiment illustrated herein, a pair of balanced shutter disks have been used which include diametrically placed notches thus eliminating the balancing problems. With this type of arrangement, the maximum speed limit insofar as rotational shutter velocity is concerned is the wobble speed limit of the reflectance assembly. While admittedly, the diametrically notched shutter disks shown produce a somewhat more pronounced focal plane effect than disks with but a single notch twice as wide and turned double the speed which would have the same instantaneous shutter speed, the elimination of balancing problems is considered to overbalance this loss for most applications.

Now, having decided upon the aforementioned factors influencing the design of the shutter mechanism, the details of the mirror wobble assembly can likewise be determined. If, for example, as in the instant camera, the shutter takes two exposures each full revolution due to the diametrically positioned notches, and the shutter is turning four times as fast as the wobble cam, then the mirror must move through eight complete wobble cycles for each revolution of the cam as indicated by the sixteen nodes 230 (both positive and negative) on the cam track that evidence a reversal in the direction of mirror movement. It is equally apparent that if the mirror stops and reverses direction twice each cycle, its motion cannot be linear and is essentially sinusoidal; yet, the image must move substantially linearly across the framing aperture at the same rate as the film while the shutter is open if a blurred image is to be eliminated. Also known, however, is the fact that at a maximum the shutter is open only during the interval required for the film to traverse one-fifth of the height of the framing aperture which means that linear synchronization between the movement of the mirror, the image reflected therefrom and the film must take place only during this critical interval. Accordingly, the cam track is designed to be substantially sinusoidal in configuration around the periphery of the cam except that straight sections are provided between those adjacent positive and negative nodes that represent the portion of the cycle during which the image is sweeping across the framing aperture with the shutter open. Similarly, the length of these straight sections must be sufficient to keep the image moving linearly across the framing aperture during the full and maximum interval that the shutter is open even though there is non-linear movement of the mirror and reflected image at both the beginning and end of the critical half-cycle. It is obvious, of course, that the mirror need not move linearly during the return half of its cycle as the shutter is never open during this period. If, as here, the shutter is at most open during an interval which amounts to the time required for the film to travel one-fifth the height of the framing aperture, the reflected image must move at a constant speed across the framing aperture for a minimum total distance no less than one-fifth the height of the framing aperture. Rotational orientation of the cam and associated cam track relative to the drive shaft will insure the fact that the image is moving at a constant speed from the instant the leading edge of the shutter opening first uncovers the framing aperture until the trailing edge finally covers it gain. This is not to say, however, that the period of constant speed movement of the image constitutes the full half-cycle of sweep because during the same half-cycle the image is moving from zero velocity to constant speed as it enters the framing aperture and, thereafter, decreases again to zero velocity as it leaves.

The next factor to be considered in the design of the cam groove or track is the length of the lever arm which forms the operative connection between the wobble cam and mirror. In actual practice, the length of this lever arm is a relatively fixed quantity for any given lens, mirror and film plane arrangement although it becomes critical in calculating the "throw" of the cam groove necessary to provide the required sweep angle of the mirror and image reflected therefrom. For example, in the system illustrated in FIGURES 1-12, inclusive, the focal length of lens 212 is known and the nodal point thereof must be located the focal length distance from the film plane as measured by a line from the nodal point that strikes the polished face of the mirror at 45° and is reflected therefrom through the framing aperture onto the film. This line, in effect, locates the plane polished face of the mirror in relation to the film plane and lens. Furthermore, the drive shaft 66 is fixed as to location and there are definite practical limits to the diameter of the cam. It is also a good idea to locate the cam groove as far out onto the periphery of the cam as practicable. Therefore, the length of the effective lever arm interconnecting the cam and mirror can be selected within only very narrow limits due to the relatively fixed position of the mirror and cam. Accordingly, once the length of lever arm 78 has been determined with certainty, it becomes a simple matter to calculate the length of the effective lever arm for the FIGURES 1-12 system, namely the distance from the film plane to the center of the mirror face where the aforementioned 45° line or light ray strikes and is reflected. The effective lever arm, in turn, is used to arrive at the "throw" of the cam track necessary to move the mirror through the required sweep angle. In other words, the distance the image must move at a constant speed across the framing aperture has already been determined and there is a minimum angle through which the plane polished face of the mirror must move at the effective lever arm distance away from the film plane in order to produce this linear motion along with the non-linear motion at the beginning and end of the critical half-cycle when the shutter is open. Having determined the foregoing minimum sweep angle, the only thing remaining is to provide that portion of the cam track lying between the positive and negative nodes with sufficient slope such that the throw resulting therefrom will be sufficient to wobble the mirror through the sweep angle.

With reference now in particular to FIGURE 13 wherein a modified form of the camera of the persent invention has been illustrated in which the lens is positioned between the mirror and film plane. Here, of course, the nodal point of the lens is located the focal length distance away from the film plane with the mirror positioned beyond the lens but close enough thereto so that the reflected image is not swept past the edges of the lens. When the entire lens is positioned between the mirror and film plane it is perfectly obvious that a longer optical lever arm X must be used than was employed in the FIGURES 1-12 system assuming lens 212 with the same focal length is found in both systems and the cam 74m remains in the same place. Note also, that the optical lever arm X in the FIGURE 13 system used to determine the required sweep angle is the distance from the nodal point of the lens to the film plane rather than from the surface of the mirror to the film plane. The sweep angle through which the mirror must move to accomplish the required image movement across the framing aperture can be calculated keeping in mind the distance through which the image must travel at a constant speed. There is one significant difference, however, in that optical lever arm X is much longer than the lever arm X of the FIGURES 1-12 system. This means, of course, that the throw of cam groove 226m can be substantially less to produce the same sweep angle in both systems although, admittedly, the latter angles may not be identical. Accordingly, the slope of that portion of the cam groove 226m lying between adjacent positive and negative nodes 230m is less than that of cam 74 making it possible to attain higher mirror wobble speeds and utilize correspondingly higher film transport speeds.

Finally, with reference to FIGURES 14 and 15, two additional modifications will be noted which correspond generally to those of FIGURE 13 and FIGURES 1-12, respectively, insofar as the relative locations of the lens, mirror and film plane are concerned, but differing therefrom in the type of mirror. In both of these latter modifications, a multi-sided rotating mirror 26m driven directly off of the motor shaft by means of a pair of meshed gears 232 and 234 is substituted for the single-faced mirror 26 and associated rocker arm 78 and cam 74 used to drive same. Functionally, both the single-faced wobbling mirror 26 and the multi-faced rotating mirror 26m accomplish the same thing and are located relative to the film plane and lens in accordance with the same principles outlined above. The advantage of the multi-faced mirror over the single-faced one is that the maximum speed at which the film can be transported past the framing aperture becomes the critical operating limit rather than the wobble speed attainable with the oscillating mirror. As illustrated, gears 232 and 234 of FIGURE 15 are smaller than the corresponding gears of FIGURE 14 due, again, to the difference in lever arm lengths.

Having thus described the several useful and novel features of the reflectance-type motion picture camera of the present invention in connection with the accompanying drawings, it will be seen that the many worthwhile objectives for which it was designed have been achieved. Although but a few of the several possible embodiments of the invention have been illustrated and described herein, I realize that certain additional modifications may well occur to those skilled in the art within the broad teaching hereof; hence, it is my intention that the scope of protection afforded thereby shall be limited only insofar as said limitations are expressly set forth in the appended claims.

What is claimed is:

1. The adjustable rotating disk shutter for motion picture cameras and the like which comprises, a pair of spaced supports at least one of which is substantially planar and includes a framing aperture positioned to admit light to a strip of film passing therebehind, a first inner shaft journalled for rotation between the supports in normal relation to the film plane and spaced to one side of the framing aperture, a first generally circular shutter disk mounted for rotation with the first inner shaft in position to cover the framing aperture, a first hollow shaft mounted for independent relative rotational movement on that portion of the first inner shaft adjacent the first disk, a second generally circular disk attached to the first hollow shaft for rotation therewith in superimposed relation on the first disk, the first disk having at least one notch in the periphery thereof positioned to register with the framing aperture and intermittently admit light therethrough onto the film, the second disk having a notch in the periphery thereof corresponding with each notch of the first disk and adapted to cooperate therewith to define an opening variable in angular extent upon rotational adjustment of the disks relative to one another, a second inner shaft mounted non-rotatably for reciprocal movement in spaced substantially parallel relation to the first pair of shafts, a second hollow shaft mounted on the second inner shaft for reciprocal movement therewith and rotational movement relative thereto, a first helical gear of one hand mounted on the first inner shaft for rotation therewith, a second helical gear of opposite hand to the first helical gear meshed with the latter and mounted on the second hollow shaft for both reciprocal and rotational movement therewith, a third helical gear of opposite hand to the first helical gear mounted on the first hollow shaft for rotational movement therewith, a fourth helical gear of the same hand as the first helical gear meshed with the third helical gear and mounted on the second hollow shaft for both reciprocal and rotational movement therewith, adjustment means connected to the second inner shaft operative upon actuation to effect reciprocal movement of the latter in a manner such that the first and second helical gears will cooperate to rotate the first disk in one direction while the third and fourth gears are cooperating to turn the second disk in the opposite direction by the same amount thus varying the effective opening defined between the overlapping peripheral notches, a drive mechanism, and power transfer means operatively interconnecting the drive mechanism with the second hollow shaft in a manner to rotate the superimposed disks in the same direction in fixed adjusted relation.

2. The adjustable rotating disk shutter as set forth in claim 1 in which the first disk has at least two notches in the periphery thereof arranged in equi-angularly spaced relation.

3. The adjustable rotating disk shutter as set forth in claim 1 in which the first and third helical gears are of the same diameter and pitch, and the second and fourth helical gears have the same diameter and pitch.

4. The adjustable rotating disk shutter as set forth in claim 1 in which the maximum effective opening defined by the registered notches in the superimposed disks is selected in relation to the rotationl speed of the shutter and film transport speed past the framing aperture such that the film traverses a distance not greater than approximately one-fifth the height of said framing aperture during the interval said shutter is open to admit light to the film.

5. The adjustable rotating disk shutter as set forth in claim 1 in which the number of notches in the periphery of the first disk is selected in relation to the rotational speed of the shutter and film transport speed past the framing aperture such that the time interval between successive exposures is not less than approximately five times the exposure time for each frame at the maximum shutter opening.

6. The adjustable rotating disk shutter as set forth in claim 1 in which the depth of the notches in the disks is at least sufficient to completely uncover the framing aperture.

7. The adjustable rotating disk shutter as set forth in claim 1 in which the adjustment means comprises a non-rotatable threaded means attached to a projecting end of the second inner shaft, a rotatable threaded means operatively connected to the non-rotatable threaded means and mounted on one of the supports in a manner such that it is restrained against reciprocal movement as it rotates, said rotatable threaded means being effective upon rotation in one direction to draw the second inner shaft and associated elements toward the support while reversing its direction of rotation causes the second inner shaft and associated elements to move away from said support.

8. In a motion picture camera including, a housing having a light-tight film compartment and a lens compartment separated from one another by a wall containing a framing aperture, a drive mechanism, a film storage reel and a film take-up reel mounted for independent relative rotational movement within the film compartment, film transport means operatively connected to the drive mechanism and mounted for rotation within the film compartment adapted to draw film from the storage reel and deliver same to the take-up reel past the framing aperture, film tensioning means operatively interconnecting the drive mechanism and the take-up spool adapted to maintain the film spooled on the latter under constant tension, and a lens system mounted within the lens compartment in position to receive an image from an exterior light source and focus same on the film through the framing aperture, the improved combination which comprises an apertured rotatable shutter mechanism operatively connected to the drive mechanism and adapted upon actuation to intermittently uncover the framing aperture at predetermined intervals, and reflectance means operatively connected to the drive mechanism and adapted to move the image across the framing aperture during the interval the shutter mechanism is open in synchronization with the movement of the film, said reflectance means comprising a mirror having at least one plane polished face mounted for limited angular movement in the path of the image entering the lens compartment about an axis located to reflect the latter through the framing aperture onto the film as it moves, and a synchronous coupling providing a positive mechanical connection between the mirror and drive mechanism adapted to move a plane polished face of the mirror through the limited angle required for the image reflected therefrom to follow the film movement across the framing aperture each time the shutter mechanism uncovers the latter during the maximum time interval said shutter is open.

9. In a motion picture camera, the improved combination as set forth in claim 8 in which, the mirror of the reflectance means is mounted for wobbling movement and includes a single plane polished face, and the synchronous coupling comprises a disk-shaped cam having a generally sinusoidal cam track encircling the periphery thereof operatively connected to the drive mechanism for rotational movement and a lever arm with a cam follower located at one end in the cam track while the other end is fixedly attached to the mirror.

10. In a motion picture camera, the improved combination as set forth in claim 9 in which that portion of the generally sinusoidal cam track controlling the movement of the mirror during the interval in which the framing aperture is uncovered by the shutter is straight in order to produce substantially linear movement of the image reflected therefrom synchronized with the movement of the film.

11. In a motion picture camera, the improved combination as set forth in claim 9 in which the cam track is designed and oriented to return the mirror to the beginning of its wobble cycle preparatory to sweeping the image reflected therefrom across the framing aperture during the interval when the shutter is closed.

12. In a motion picture camera, the improved combination as set forth in claim 9 in which the reflectance means includes a knife-edged fulcrum on which the mirror is mounted for wobbling movement and spring means connected between a fixed support and the mirror yieldably holding the latter against the fulcrum.

13. In a motion picture camera, the improved combination as set forth in claim 8 in which the reflectance means is located within the lens compartment in position to receive the image from the lens and reflect same through the framing aperture onto the film.

14. In a motion picture camera, the improved combination as set forth in claim 8 in which the shutter mechanism comprises a pair of spaced supports at least one of which is substantially planar and includes a framing aperture positioned to admit light to a strip of film passing therebehind, a first inner shaft journalled for rotation between the supports in normal relation to the film plane and spaced to one side of the framing aperture, a first generally circular shutter disk mounted for rotation with the first inner shaft in position to cover the framing aperture, a first hollow shaft mounted for independent relative rotational movement on that portion of the first inner shaft adjacent the first disk, a second generally circular disk attached to the first hollow shaft for rotation therewith in superimposed relation on the first disk, the first disk having at least one notch in the periphery thereof positioned to register with the framing aperture and intermittently admit light therethrough onto the film, the second disk having a notch in the periphery thereof corresponding with each notch of the first disk and adapted to cooperate therewith to define an opening variable in angular extent upon rotational adjustment of the disks relative to one another, a second inner shaft mounted non-rotatably for reciprocal movement in spaced substantially parallel relation to the first pair of shafts, a second hollow shaft mounted on the second inner shaft for reciprocal movement therewith and rotational movement relative thereto, a first helical gear of one hand mounted on the first inner shaft for rotation therewith, a second helical gear of opposite hand to the first helical gear meshed with the latter and mounted on the second hollow shaft for both reciprocal and rotational movement therewith, a third helical gear of opposite hand to the first helical gear mounted on the first hollow shaft for rotational movement therewith, a fourth helical gear of the same hand as the first helical gear meshed with the third helical gear and mounted on the second hollow shaft for both reciprocal and rotational movement therewith, adjustment means connected to the second inner shaft operative upon actuation to effect reciprocal movement of the latter in a manner such that the first and second helical gears will cooperate to rotate the first disk in one direction while the third and fourth gears are cooperating to turn the second disk in the opposite direction by the same amount thus varying the effective opening defined between the overlapping peripheral notches, a drive mechanism, and power transfer means operatively interconnecting the drive mechanism with the second hollow shaft in a manner to rotate the superimposed disks the same direction in fixed adjusted relation.

15. In a motion picture camera, the improved combination as set forth in claim 14 in which the maximum effective opening defined by the registered notches in the superimposed disks is selected in relation to the rotational speed of the shutter and film transport speed past the framing aperture such that the film traverses a distance not greater than approximately one-fifth the height of said framing aperture during the interval said shutter is open to admit light to the film.

References Cited by the Examiner

UNITED STATES PATENTS

| | | | |
|---|---|---|---|
| 1,085,392 | 1/14 | Van Riper | 88—16.8 |
| 1,273,327 | 7/18 | Bullock | 88—16.8 |
| 1,283,577 | 11/18 | Sloman | 88—16.8 |
| 1,450,433 | 4/23 | Davis | 88—19.3 |
| 1,486,226 | 3/24 | Capstaff et al. | 88—16.8 |
| 1,605,874 | 11/26 | Underwood | 242—75 |
| 1,878,381 | 9/32 | Continsouza et al. | 242—75 |
| 1,980,915 | 11/34 | Graser | 88—16.8 |
| 2,045,260 | 6/36 | Berggren | 88—19.3 |
| 2,895,375 | 7/59 | Wittel | 88—17 |

FOREIGN PATENTS

| | | |
|---|---|---|
| 361,078 | 3/06 | France. |
| 375,406 | 5/07 | France. |
| 557,353 | 5/23 | France. |
| 335,139 | 3/21 | Germany. |
| 219,163 | 5/42 | Switzerland. |

EVON C. BLUNK, *Primary Examiner.*

EMIL G. ANDERSON, WILLIAM MISIEK, NORTON ANSHER, *Examiners.*